US009368035B2

(12) United States Patent
Mere et al.

(10) Patent No.: US 9,368,035 B2
(45) Date of Patent: Jun. 14, 2016

(54) METHOD AND DEVICE FOR AUTOMATICALLY MONITORING A FLIGHT PATH OF AN AIRCRAFT DURING AN OPERATION WITH REQUIRED NAVIGATION PERFORMANCE

(71) Applicant: Airbus Operations (SAS), Toulouse (FR)

(72) Inventors: Jean-Claude Mere, Verfeil (FR); Gilles Tatham, Pibrac (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 14/475,732

(22) Filed: Sep. 3, 2014

(65) Prior Publication Data

US 2015/0073691 A1 Mar. 12, 2015

(30) Foreign Application Priority Data

Sep. 11, 2013 (FR) .................................... 13 58716

(51) Int. Cl.
*G06F 19/00* (2011.01)
*G08G 5/00* (2006.01)
*G05D 1/10* (2006.01)

(52) U.S. Cl.
CPC .............. *G08G 5/0013* (2013.01); *G05D 1/101* (2013.01); *G08G 5/0034* (2013.01); *G08G 5/0039* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,439,862 A * | 4/1948 | Preston | G08G 5/0026 178/4 |
| 3,784,969 A * | 1/1974 | Wilckens | G01S 1/02 340/972 |
| 4,642,775 A * | 2/1987 | Cline | G01C 23/00 701/528 |
| 4,656,463 A * | 4/1987 | Anders | G01S 13/78 340/10.34 |
| 4,827,395 A * | 5/1989 | Anders | G01S 13/78 340/10.1 |
| 6,856,864 B1 * | 2/2005 | Gibbs | G06F 3/0237 701/14 |
| 7,693,621 B1 * | 4/2010 | Chamas | G08G 5/0021 340/951 |
| 8,090,525 B2 * | 1/2012 | Villiers | G08G 5/0013 342/29 |

FOREIGN PATENT DOCUMENTS

| | | |
|---|---|---|
| FR | 2923614 | 5/2009 |
| FR | 2930987 | 11/2009 |
| WO | 2013082657 | 6/2013 |

OTHER PUBLICATIONS

French Search Report, May 30, 2014
The Avionics Handbook, Walter R Ed., Jan. 1, 2001.

*Primary Examiner* — Jonathan L Sample
(74) *Attorney, Agent, or Firm* — Greer, Burns & Crain Ltd.

(57) ABSTRACT

A monitoring device including a memory containing a reference path, the memory being separate from a flight management system. The reference path corresponding to a path that is defined during a navigation data validation on ground for the flight management system. A monitoring unit is configured to monitor a current flight path that is determined by the flight management system, by monitoring if this current flight path is in conformity with the reference flight path that is recorded in the memory.

12 Claims, 1 Drawing Sheet

(56) References Cited

U.S. PATENT DOCUMENTS

| | | | | |
|---|---|---|---|---|
| 8,447,520 | B2 * | 5/2013 | Gine I Cortiella | G01C 23/005 701/400 |
| 8,892,273 | B1 * | 11/2014 | Raghu | B64D 43/00 235/462.01 |
| 2003/0058136 | A1 * | 3/2003 | Hedrick | G01C 23/00 340/973 |
| 2006/0206246 | A1 * | 9/2006 | Walker | G06Q 10/00 701/16 |
| 2007/0046680 | A1 * | 3/2007 | Hedrick | G01C 23/00 345/503 |
| 2008/0091309 | A1 * | 4/2008 | Walker | B60R 25/02 701/1 |
| 2008/0140270 | A1 * | 6/2008 | Davis | G01C 21/00 701/8 |
| 2009/0043433 | A1 * | 2/2009 | Markiton | G01C 23/005 701/15 |
| 2009/0105943 | A1 * | 4/2009 | Ferro | G01C 23/005 701/533 |
| 2009/0157241 | A1 * | 6/2009 | Meunier | G01S 13/94 701/9 |
| 2010/0282916 | A1 * | 11/2010 | Garrido-Lopez | G05D 1/101 244/175 |
| 2011/0060483 | A1 * | 3/2011 | Gine I Cortiella et al. | 701/3 |
| 2011/0208422 | A1 * | 8/2011 | Nakano | G01C 21/36 701/467 |
| 2012/0282962 | A1 * | 11/2012 | Madon | H04W 16/04 455/509 |
| 2013/0031536 | A1 * | 1/2013 | De | G06F 9/4552 717/146 |
| 2013/0046422 | A1 * | 2/2013 | Cabos | G08G 5/0034 701/3 |
| 2013/0046462 | A1 * | 2/2013 | Feyereisen | G08G 5/025 701/457 |
| 2014/0210648 | A1 * | 7/2014 | Samuthirapandian | G08G 5/0008 340/961 |

* cited by examiner

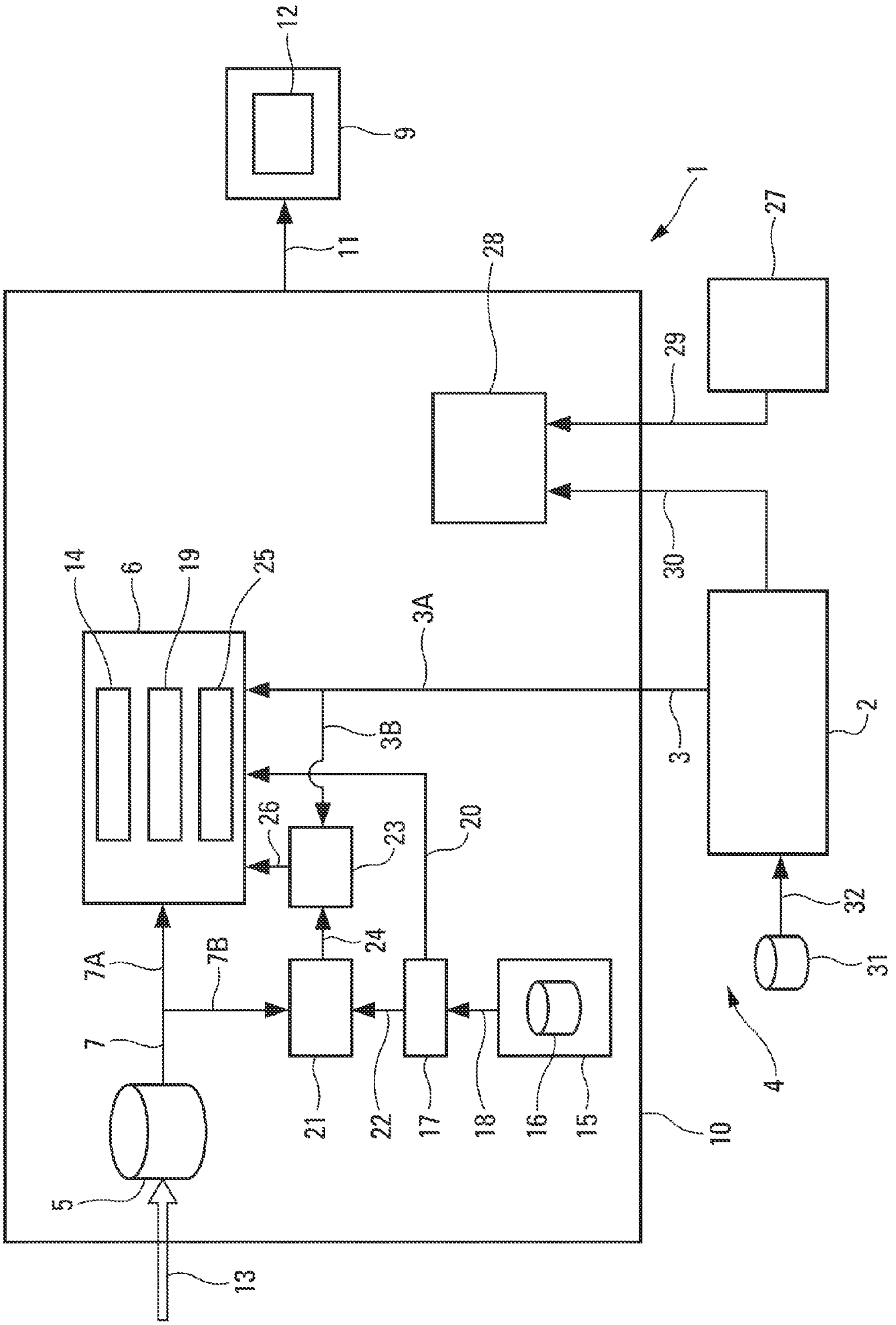
12
9
1
27
28
29
30
3A
14
6
19
25
3B
2
3
26
23
20
32
31
24
7A
7B
7
4
5
21
22
17
18
16
15
10
11
13

METHOD AND DEVICE FOR AUTOMATICALLY MONITORING A FLIGHT PATH OF AN AIRCRAFT DURING AN OPERATION WITH REQUIRED NAVIGATION PERFORMANCE

CROSS-REFERENCES TO RELATED APPLICATIONS

This application claims the benefit of the French patent application No. 1358716 filed on Sep. 11, 2013, the entire disclosures of which are incorporated herein by way of reference.

BACKGROUND OF THE INVENTION

The present invention relates to a method and to a device for automatically monitoring a flight path of an aircraft during a required navigation performance operation of an aircraft, in particular a transport airplane.

Although not exclusively, the present invention applies more particularly to required navigation performance with authorization required (RNP AR) operations. These RNP AR operations are based on area navigation (RNAV) and on required navigation performance (RNP) operations. They have the distinctive feature of requiring special authorization in order to be implemented on an aircraft.

It is known that the aircraft is provided with monitoring and alert means allowing it to be ensured that said aircraft remains in a corridor, referred to as RNP, around a prescribed path. Outside of this corridor, there are potentially hilly or mountainous areas or other aircraft. The required performance for an RNP-type operation is defined by an RNP value which represents the half-width (in nautical miles (NM)) of the corridor around the reference path in which the aircraft must remain for 95% of the time during operation. A second corridor (around the reference path) of a half-width of twice the RNP value is also defined. The probability that the aircraft will leave this second corridor has to be less than 10-7 per flight hour. The concept behind RNP AR operations is yet more restrictive. The RNP AR procedures are in fact characterized in particular by RNP values which are less than or equal to 0.3 NM on approach, and which may drop as far as 0.1 NM.

Demonstrating that avionics systems allow RNP-type operations to be carried out with sufficient availability and precision is based on a statistical analysis of the different sources of error which may lead to a discrepancy between the position of the aircraft and the procedure as published on the approach charts.

Three separate sources are considered to characterize the aggregate error: an error in defining (or in calculating) the path, an error in navigation (position calculation) and an error in guidance.

During a required navigation performance operation, the position of the aircraft is monitored in real-time, and an alarm is sounded to the crew when the aircraft departs beyond an acceptable limit from the path extracted from an on-board navigation database.

In order to guard against possible coding errors in the navigation database (NDB), airlines whose aircraft implement such operations are required to validate the database each time the data is updated, currently every twenty-eight days (AIRAC cycle). In practice, this validation may be carried out on simulators of the airline by flying each RNP approach in the database that the airline wishes to operate and by ensuring that, in each case, the path flown on the simulator conforms to the published procedure.

However, this verification, which is carried out on the ground, only allows coding errors in the database to be remedied, and not extraction or corruption errors when loading the data onto the flight management system of the aircraft that is intended to calculate the flight path. In addition, guidance on the corresponding flight path and monitoring in real-time carried out at the current position of the aircraft are only relevant if the procedure loaded onto aircraft systems and then the calculation of the path are consistent. If the procedure is corrupted during or after loading or if the flight management system calculates an incorrect path, the problem is thus identified owing to the expertise of the crew (comparison with the approach charts or experience of the procedure), which allows the problem to be identified.

The problem addressed by the present invention is that of improving the integrity of the guidance based on published procedure during required navigation performance operations, in particular RNP AR operations having low values (less than 0.3, for example).

SUMMARY OF THE INVENTION

The present invention relates to a method for automatically monitoring a flight path of an aircraft during at least one required navigation performance operation, said flight path which is intended for such an operation being determined by a flight management system of the aircraft using navigation data stored in an on-board database.

For this purpose, according to the invention, said method is distinctive in that it comprises the following steps a) and b), comprising:

a) logging the reference path in an on-board memory, said memory being independent of a sequence for calculating the flight path comprising at least said flight management system, said reference path representing a path defined during the ground validation of said navigation data; and b) using said reference path to monitor a current flight path determined by the flight management system, by verifying the consistency between said current flight path and said reference path.

Therefore, since a reference path is taken into account which is accurate because it originates from ground validation of navigation data, it is possible to accurately monitor the (current) flight path in question, thereby allowing the required integrity of said path to be ensured for the implementation of a required navigation performance operation.

Within the context of the present invention, "sequence for calculating the flight path" means all the systems and conventional on-board means, including at least the flight management system, which intervene when the flight path intended to be followed by the aircraft is determined on board said aircraft.

The monitoring method may also comprise the following steps and features, taken in isolation or in combination:

- an additional step, after step b), comprising presenting monitoring results to the crew, at least in the event of inconsistency between the current flight path determined by the flight management system and the reference path;
- an additional step, before step a), comprising determining, on the ground, during a validation of the navigation data intended to be stored in said on-board database, a path using a simulator which simulates the functioning of the aircraft, and to which said navigation data are applied, the path thus determined being logged as a reference path in said on-board memory in step a);

in step a), in addition to the reference path, procedural information is also logged in the on-board memory; and in step a), logging in the on-board memory is carried out in a coded manner.

In a basic embodiment, in step b), said current flight path is compared with said reference path, and it is considered to be consistent if it does not depart therefrom by a first predefined close margin.

Furthermore, said method advantageously also comprises steps comprising:

logging flight paths of the aircraft determined by a position calculation unit during required navigation performance operations; and calculating an average path using said flight paths thus logged.

In addition, in a particular embodiment, in step b), said current flight path is compared with said average path, and it is considered to be consistent if it does not depart therefrom by a second predefined close margin.

Furthermore, said method advantageously also comprises steps comprising:

calculating the difference between said average path and said reference path so as to obtain a bias;

adding this bias to a current flight path determined by said flight management system so as to form a corrected current path; and comparing this corrected current path with said reference path in order to verify the consistency.

In addition, said method advantageously comprises additional steps, after step b), comprising, in real-time, during the implementation of a required navigation performance operation:

determining the current position of the aircraft; and comparing this current position with the current flight path determined by the flight management system for said required navigation performance operation.

In the context of the present invention:

"procedural information" is understood to mean information that is used by the aircraft to implement and follow procedure, in particular the flight plan, "coded logging" is understood to mean logging which is secured using a particular code, for example a cyclic redundancy code (CRC), and "current path" is understood to mean the path that the aircraft follows (or will follow) in order to carry out the current procedure (or the procedure that will be carried out).

The present invention also relates to a device for automatically monitoring a flight path of an aircraft, in particular a transport airplane, during a required navigation performance operation, said flight path, which is intended for the required navigation performance operation, being determined by a flight management system of the aircraft using navigation data stored in an on-board database.

According to the invention, said monitoring device is distinctive in that it comprises:

an on-board memory in which a reference path is stored, said memory being independent of a sequence for calculating the flight path comprising at least said flight management system, said reference path representing a path defined during the ground validation of said navigation data; and a first monitoring unit configured to monitor a current flight path determined by the flight management system by verifying the consistency between said current flight path and the reference path logged in said on-board memory.

In addition, in a preferred embodiment, said monitoring device also comprises:

a logging unit configured to log, in an auxiliary memory, flight paths of the aircraft determined by a position calculation unit during required navigation performance operations; and a first calculation unit configured to calculate an average path using said flight paths logged in said auxiliary memory.

In addition, said monitoring device advantageously also comprises:

a second calculation unit configured to calculate the difference between said average path and said reference path so as to obtain a bias;

a third calculation unit configured to add this bias to a current flight path determined by said flight management system so as to form a corrected current path; and a first comparison element configured to compare this corrected current path with said reference path to verify the consistency.

This third calculation unit can be integrated in the flight management system or at least can transmit the bias or the corrected path to the flight management system so that the aircraft is guided along this path.

Furthermore, in a particular embodiment, said monitoring device also comprises:

a position calculation unit configured to determine, in real-time, the current position of the aircraft during the implementation of a required navigation performance operation; and a second comparison element configured to compare, in real-time, this current position with the current flight path determined by the flight management system.

The present invention also relates to:

a guidance system for the aircraft which comprises a conventional flight management system and a monitoring device as set out above; and/or an aircraft, in particular a transport airplane, which is provided with such a guidance system and/or such a monitoring device.

BRIEF DESCRIPTION OF THE DRAWINGS

The single FIGURE of the accompanying drawings will enable a good understanding of how the invention can be carried out. This single FIGURE is a block diagram of a particular embodiment of a device for automatically monitoring a flight path.

DETAILED DESCRIPTION OF THE PREFERRED EMBODIMENTS

The device 1, which is shown schematically in the FIGURE and illustrates the invention, is installed in an aircraft, in particular a transport airplane, and is intended to automatically monitor a flight path during a required navigation performance operation implemented by the aircraft.

The flight path intended for a required navigation performance operation is conventionally determined by a flight management system 2 of the aircraft, using in particular navigation data stored in an on-board database 31 which is connected to said flight management system 2 by means of a connection 32, as shown in the FIGURE.

In the particular embodiment shown in the FIGURE, said monitoring device 1 and said flight management system 2, which are interconnected by a connection 3, are part of the guidance system 4 of the aircraft.

According to the invention, said monitoring device 1 comprises a central unit 10, comprising:

an on-board memory 5 in which a reference path TR is logged. This memory 5 is independent of a sequence for calculating the flight path comprising at least said flight management system 2. This reference path TR represents a path that is defined during ground validation of the navigation data stored in the on-board database 31, as specified below; and a monitoring unit 6 which is connected to said memory 5 by means of a connection 7 and is configured to monitor a current flight path TC determined by the flight management system 2 by verifying the conformity between said current flight path TC, received by means of a connection 3A (linked to the connection 3), and the reference path TR logged in the on-board memory 5 (and received by the connection 7).

The monitoring device 1 also comprises a display unit 9 that is connected to said central unit 10 by means of a connection 11 and is configured to present the crew with the results of the monitoring, carried out by the central unit 10 and in particular by the monitoring unit 6, on a display screen 12 in the cockpit of the aircraft.

In a preferred embodiment, said display unit 9 displays the monitoring results at least in the event of inconsistency between the current flight path TC determined by the flight management system 2 and the reference path TR.

Conventionally, during a ground validation of the navigation data intended for a required navigation performance operation (which will then be logged in the on-board database 31), a simulator is used which simulates the functioning (or flight) of the aircraft, and said navigation data are applied to said simulator, thereby allowing a path to be defined which is logged as a reference path in said memory 5 via a conventional data transmission connection 13. This reference path is sufficiently consistent with the procedure that it describes that it is able to serve as reference during the preparation and the flight within this procedure.

In a particular embodiment, in addition to the reference path, procedural information relating to the procedure is also logged in the on-board memory 5 via the data transmission connection 13.

In a preferred embodiment, logging in the on-board memory via the data transmission connection 13 is carried out in a coded manner, with additional protection in relation to the coding of the database 31, for example of the CRC type, in order to overcome corruption problems during transfer to avionics systems.

In a basic embodiment, the monitoring unit 6 comprises a comparison element 14 which is configured to compare the current flight path TC received by means of the connection 3A with said reference path TR received by means of a connection 7A (connected to the connection 7), and the monitoring unit 6 considers that the current flight path TC is consistent with said reference path TR if it does not depart therefrom by a predefined close margin.

The monitoring device 1 can be put to use on systems that are already used by airlines which operate RNP procedures and can be deployed without a significant impact on airline operations. In addition, the impact in terms of the system (storage and complementary monitoring, as specified below) is sufficiently minor for it be able to be installed on existing aircraft.

In a particular embodiment, the central unit 10 is accommodated in a flight warning computer (FWC).

Moreover, it is conceivable for the navigation database to be verified on the ground for each new cycle (AIRAC cycle), whether or not the procedure has changed, and for the test of the integrity of the database required for airline operations and the update of the information stored on board to only be triggered in the event of problems relating to the consistency between the new database and the reference procedure.

Furthermore, in a preferred embodiment, said monitoring device 1 also comprises:

a logging unit 15 which is configured to log, in an auxiliary memory 16, flight paths of the aircraft determined by a position calculation unit 27 during required navigation performance operations and received via a connection (not shown) (connected for example to a connection 29 specified below). Preferably, each new flight path determined by the position calculation unit 27 is logged in the auxiliary memory 16. Logging the flight paths preferably comprises logging a succession of aircraft positions estimated by the position calculation unit 27 (specified below); and a calculation unit 17 which is configured to calculate an average path TM using different flight paths thus logged (successively) in said auxiliary memory 16 and received via a connection 18.

In a particular embodiment, the monitoring unit 6 comprises a comparison element 19 which is configured to compare a current flight path TC, received via the connection 3A, with the average path TM (calculated by the calculation unit 17 and received via a connection 20), and the monitoring unit 6 considers that the current flight path TC is consistent with this average path TM if it does not depart therefrom by a predefined close margin. This particular embodiment, however, does not allow errors in loading and calculation to be completely overcome. In fact, it merely contributes to the improvement of the integrity of the path only with respect to non-generic errors, constant biases (NDB coding error, for example) being necessarily propagated by the calculation of the average path TM, each path being affected by the same error.

Also to overcome this drawback, in a preferred embodiment, said monitoring device 1 also comprises:

a calculation unit 21 which is configured to calculate the difference between said average path TM received via a connection 22 and said reference path TR received via a connection 7B (connected to the connection 7) so as to obtain a bias Δ;

a calculation unit 23 which is configured to add this bias Δ (received by a connection 24 of the calculation unit 21) to a current flight path TC determined by said flight management system 2 and received by a connection 3B (connected to the connection 3A) so as to form a corrected current path TRC; and a comparison element 25 which is integrated in the monitoring unit 6 and which is configured to compare this corrected current path TRC received by a connection 26 with said reference path TR received by the connection 7A.

The path TM resulting from the average of the current paths allows random errors to be overcome, said path thus represents the resultant of the systematic errors in the complete sequence (position calculation, path calculation and guidance), to the extent that by comparing said path with the reference path TR, it is conceivable for automatic corrections to be implemented in order to overcome these generic errors. By correcting the current path of the bias Δ (between the reference path TR and the path TM resulting from the average of the different paths), only the random components from various error sources remain. The aggregate error is greatly reduced and the monitoring of the current path will be even more efficient (reduction in the rate of false alarms).

The monitoring device 1 can thus use the average path TM calculated by the calculation unit 17 to serve as the reference path to compare with a current path, or to correct the biases in the guidance sequence.

Furthermore, in a particular embodiment, said monitoring device 1 also comprises:

the position calculation unit 27, of a conventional type, which is configured to determine, in real-time, the current position (that is to say the position at the relevant moment) of the aircraft during a flight and during implementation of an operation as set out above; and a comparison unit 28 which is, for example, integrated in the central unit 10 and is configured to compare, in real-time, this current position received via a connection 29 with the current flight path TC determined by the flight management system 2 and received via a connection 30.

Thus, said monitoring device 1, which is independent of the flight management system 2, accommodates the real-time monitoring of the current position of the aircraft in addition to monitoring of the extraction and calculation of the path.

The invention has several advantages:

adding monitoring between the path TC calculated by the flight management system 2 and that stored in the memory 5 to serve as a reference allows any problems in the sequence for calculating the path to be identified and thus allows not only the integrity of the calculation of the path used to slave the position of the aircraft but also the relevance of the real-time monitoring of the position of the aircraft relative to the calculated path to be ensured, thereby also allowing guidance calculator errors to be covered; and more generally, defining the reference path TR (with or without the corresponding procedure—the flight plan) allows the independence thereof from the reference path which is used by the avionics systems to be ensured so that the comparison of the two, together with the real-time monitoring of the position of the aircraft relative to the path, ensures accumulated cover of the various types of possible fault. In particular, it allows types of fault that are common in flight management and guidance systems to be covered. Only the generic failures linked to the calculation of the position are not covered.

In addition, the present invention has little impact on the current, common practices of the airline operations, so that it is easier to implement, thereby allowing the monitoring device 1 to be installed on an existing aircraft.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for automatically monitoring a flight path of an aircraft during at least one required navigation performance operation, comprising the steps:

determining said flight path, which is intended for the required navigation performance operation, by a flight management system of the aircraft using navigation data stored in a database on board the aircraft, determining, on the ground, during a validation of the navigation data intended to be stored in said on-board database, a path using a simulator which simulates the functioning of the aircraft, and to which said navigation data are applied, the path thus determined being considered to be the reference path, said method also comprising the following steps a) b), c), and d) taking place on the aircraft, of:

a) logging the reference path in a memory on board by a central unit of a flight warning computer within the aircraft, said memory being independent of a sequence for calculating the flight path comprising at least said flight management system, the reference path representing the path defined in the previous step during the ground validation of said navigation data; and b) using said reference path to monitor a current flight path determined by the flight management system by verifying the consistency between said current flight path and said reference path using a monitoring unit of the central unit;

c) logging flight paths of the aircraft determined by a position calculation unit during required navigation performance operations;

d) calculating an average path using said flight paths thus logged wherein, in step b), said current flight path is compared with said average path, and it is considered to be consistent if it does not depart therefrom by a second predefined close margin to reduce non-generic errors resulting from a coding error.

2. The method according to claim 1, comprising an additional step, after step b), comprising:

presenting monitoring results to the crew, at least in the event of inconsistency between the current flight path determined by the flight management system and the reference path.

3. The method according to claim 1, wherein, in step a), in addition to the reference path, procedural information is also logged in the on-board memory.

4. The method according to claim 1, wherein, in step a), logging in the on-board memory is carried out in a coded manner.

5. The method according to claim 1, wherein, in step b), said current flight path is compared with said reference path, and it is considered to be consistent if it does not depart therefrom by a first predefined close margin.

6. The method according to claim 1, comprising steps comprising:

calculating the difference between said average path and said reference path so as to obtain a bias;

adding this bias to a current flight path determined by said flight management system so as to form a corrected current path; and comparing, in step b), this corrected current path with said reference path in order to verify the consistency to reduce generic errors resulting from at least one of a loading error and a calculation error.

7. The method according to claim 1, comprising additional steps, after step b), comprising, in real-time, during the implementation of a required navigation performance operation:

determining the current position of the aircraft; and comparing this current position with the current flight path determined by the flight management system for said required navigation performance operation.

8. A device for automatically monitoring a flight path of an aircraft during at least one required navigation performance operation, said flight path which is intended for a required navigation performance operation being determined by a flight management system of the aircraft using navigation data stored in a database on board the aircraft, said device comprising:

an on-board memory in which a reference path is stored, said memory being independent of a sequence for calculating the flight path comprising at least said flight management system, said reference path representing a path defined on the ground, during a validation of the navigation data intended to be stored in said on-board database using a simulator which simulates the functioning of the aircraft, and to which said navigation data are applied; and a monitoring unit configured to monitor a current flight path determined by the flight management system by verifying the consistency between said current flight path and the reference path logged in said on-board memory;

a logging unit configured to log, in an auxiliary memory, flight paths of the aircraft determined by a position calculation unit during required navigation performance operations; and a first calculation unit configured to calculate an average path using said flight paths logged in said auxiliary memory wherein said current flight path is compared with said average path, and it is considered to be consistent if it does not depart therefrom by a second predefined close margin to reduce non-generic errors resulting from a coding error.

9. The device according to claim 8, further comprising:

a second calculation unit configured to calculate the difference between said average path and said reference path so as to obtain a bias;

a third calculation unit configured to add the bias to a current flight path determined by said flight management system so as to form a corrected current path; and a first comparison element configured to compare this corrected current path with said reference path to verify the consistency to reduce generic errors resulting from at least one of a loading error and a calculation error.

10. The device according to claim 8, further comprising:

a position calculation unit configured to determine, in real-time, the current position of the aircraft during the implementation of a required navigation performance operation; and a second comparison element configured to compare, in real-time, this current position with the current flight path determined by the flight management system.

11. An aircraft, comprising a device for automatically monitoring a flight path of an aircraft during at least one required navigation performance operation, said flight path which is intended for a required navigation performance operation being determined by a flight management system of the aircraft using navigation data stored in a database on board the aircraft, said device comprising:

an on-board memory in which a reference path is stored, said memory being independent of a sequence for calculating the flight path comprising at least said flight management system, said reference path representing a path defined on the ground, during a validation of the navigation data intended to be stored in said on-board database using a simulator which simulates the functioning of the aircraft, and to which said navigation data are applied; and a monitoring unit configured to monitor a current flight path determined by the flight management system by verifying the consistency between said current flight path and the reference path logged in said on-board memory a logging unit configured to log, in an auxiliary memory, flight paths of the aircraft determined by a position calculation unit during required navigation performance operations; and a first calculation unit configured to calculate an average path using said flight paths logged in said auxiliary memory wherein said current flight path is compared with said average path, and it is considered to be consistent if it does not depart therefrom by a second predefined close margin to reduce non-generic errors resulting from a coding error.

12. The aircraft of claim 11, including the device for automatically monitoring a flight path of an aircraft during at least one required navigation performance operation, the device further comprising:

a second calculation unit configured to calculate the difference between said average path and said reference path so as to obtain a bias;

a third calculation unit configured to add the bias to a current flight path determined by said flight management system so as to form a corrected current path; and a first comparison element configured to compare this corrected current path with said reference path to verify the consistency to reduce generic errors resulting from at least one of a loading error and a calculation error.

* * * * *